(12) United States Patent
Calahorrano et al.

(10) Patent No.: US 11,614,057 B2
(45) Date of Patent: Mar. 28, 2023

(54) VEHICLE AIR INDUCTION ASSEMBLY

(71) Applicant: Nissan North America, Inc., Franklin, TN (US)

(72) Inventors: Nancy Michelle Calahorrano, Toluca (MX); Cesar Sanchez, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 103 days.

(21) Appl. No.: 16/917,558

(22) Filed: Jun. 30, 2020

(65) Prior Publication Data
US 2021/0404425 A1    Dec. 30, 2021

(51) Int. Cl.
*F02M 35/02* (2006.01)
*F02M 35/04* (2006.01)
*F02M 35/10* (2006.01)
*F02M 35/024* (2006.01)

(52) U.S. Cl.
CPC .. *F02M 35/10262* (2013.01); *F02M 35/0204* (2013.01); *F02M 35/024* (2013.01); *F02M 35/048* (2013.01); *F02M 35/10144* (2013.01); *F02M 35/10321* (2013.01)

(58) Field of Classification Search
CPC .... B60K 13/02; B60K 13/06; F02M 35/0204; F02M 35/10144; F02M 35/161; F02M 35/10262; F02M 35/10354
See application file for complete search history.

(56) References Cited

U.S. PATENT DOCUMENTS

| 5,564,513 | A | 10/1996 | Wible et al. | |
|---|---|---|---|---|
| 2011/0017535 | A1* | 1/2011 | Salvesen | F02M 35/08 180/68.3 |
| 2012/0048632 | A1* | 3/2012 | Mehlos | F02M 35/161 180/68.3 |
| 2012/0111653 | A1* | 5/2012 | Stuckey | B60K 11/08 180/68.3 |
| 2017/0328317 | A1* | 11/2017 | Wadi | F02M 35/10262 |
| 2021/0402871 | A1* | 12/2021 | De La Rosa | B60R 13/005 |

FOREIGN PATENT DOCUMENTS

| DE | 102008064519 A1 | 7/2010 | | |
|---|---|---|---|---|
| DE | 102014004947 A1 | * 11/2014 | | B60K 13/02 |
| DE | 102016209676 A1 | * 12/2016 | | B60R 21/34 |
| JP | 2008247122 A | * 10/2008 | | |
| WO | WO-2017102681 A1 | * 6/2017 | | B01D 45/04 |

* cited by examiner

*Primary Examiner* — Michael A Kessler
(74) *Attorney, Agent, or Firm* — Global IP Counselors, LLP

(57) ABSTRACT

A vehicle air induction assembly includes an air guide, an air duct and a bracket member. The air duct is configured to supply air to an engine air filter. The air guide has an opening therein and is configured to be connected to a vehicle fascia. The air duct is configured to be connected to the air guide such that air flowing through the opening flows into the air duct. The bracket member is connected to the air guide. The bracket member has a first side wall, a second side wall and a lower wall connecting the first and second side walls. The bracket member and the air duct are disposed on opposite sides of the air guide opening. An air inlet is defined by the air guide and the bracket member.

19 Claims, 5 Drawing Sheets

VEHICLE AIR INDUCTION ASSEMBLY

BACKGROUND

Field of the Invention

The present invention generally relates to a vehicle air induction assembly. More specifically, the present invention relates to a vehicle air induction assembly that facilitates preventing foreign materials, such as snow, from being supplied to the engine air filter.

Background Information

Air is drawn in by a vehicle and is supplied to the engine for combustion. The air passes through an engine air filter to remove dirt, debris and other foreign materials from the air supply and to prevent such materials from reaching the engine. A reduction in the supply of air to the engine can negatively impact the performance of the engine. For example, snow can be drawn in with the air and can accumulate in the engine air filter, thereby resulting in freezing or otherwise reducing the flow of air through the engine air filter.

SUMMARY

One object of the disclosure is to provide a vehicle air induction assembly that facilitates preventing dirt, debris and other foreign materials, such as snow, drawn in with external air from being supplied to the engine air filter.

In view of the state of the known technology, one aspect of the present invention is to provide a vehicle air induction assembly including an air guide, an air duct and a bracket member. The air duct is configured to supply air to an engine air filter. The air guide has an opening therein and is configured to be connected to a vehicle fascia. The air duct is configured to be connected to the air guide such that air flowing through the opening flows into the air duct. The bracket member is connected to the air guide. The bracket member has a first side wall, a second side wall and a lower wall connecting the first and second side walls. The bracket member and the air duct are disposed on opposite sides of the air guide opening. An air inlet is defined by the air guide and the bracket member.

Another aspect of the present invention is to provide a vehicle air intake system including a vehicle fascia and a vehicle air induction assembly connected to the vehicle fascia. The vehicle air induction assembly includes an air guide, an air duct, and a bracket member. The air guide has an opening therein and is connected to a vehicle fascia. The air duct is connected to the air guide such that air flowing through the air guide opening flows into the air duct. The air duct is configured to supply air to an engine air filter. The bracket member is connected to the air guide. The bracket member and the air duct are disposed on opposite sides of the air guide opening. The bracket member and the air guide define an air flow passage supplying air to the air guide opening.

Also other objects, features, aspects and advantages of the disclosed vehicle air induction assembly will become apparent to those skilled in the art from the following detailed description, which, taken in conjunction with the annexed drawings, discloses exemplary embodiments of the vehicle air induction assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
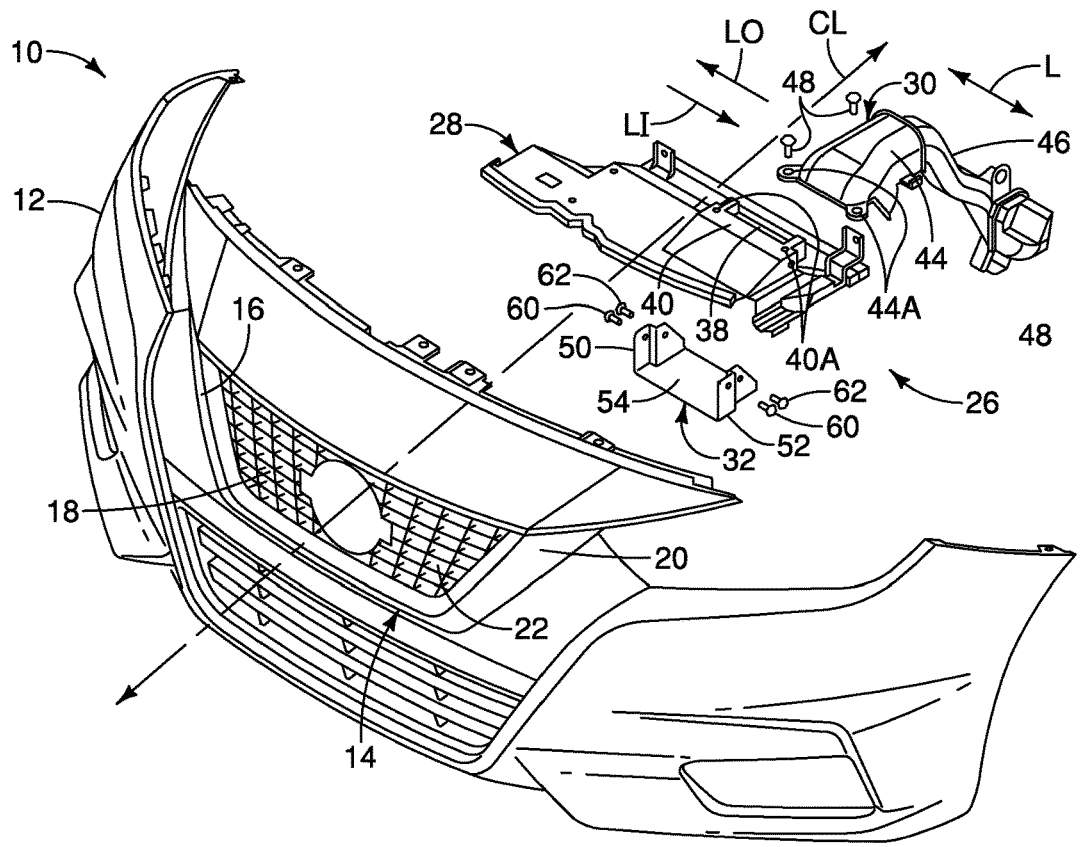
FIG. 1 is an exploded perspective view of a vehicle air induction assembly in accordance with an exemplary embodiment of the present invention.
Figure 2:
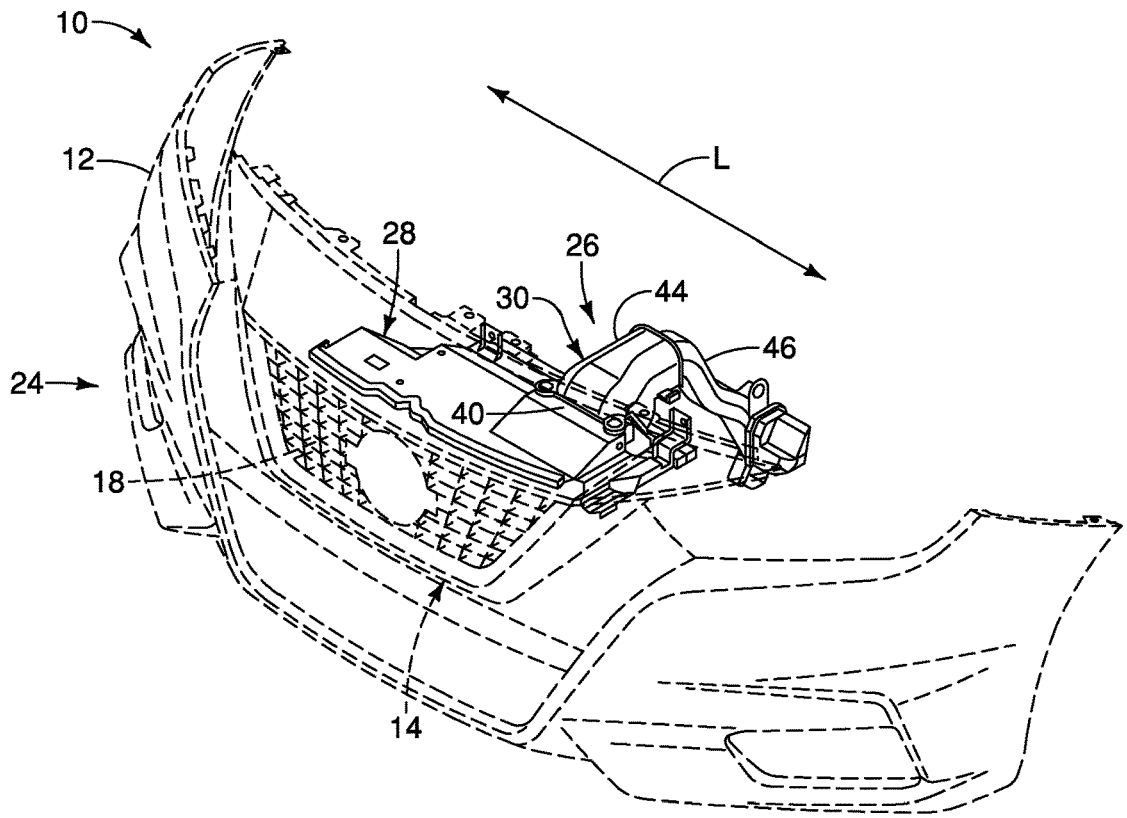
FIG. 2 is a perspective view of the vehicle air induction assembly of FIG. 1 connected to a fascia of a vehicle.
Figure 3:
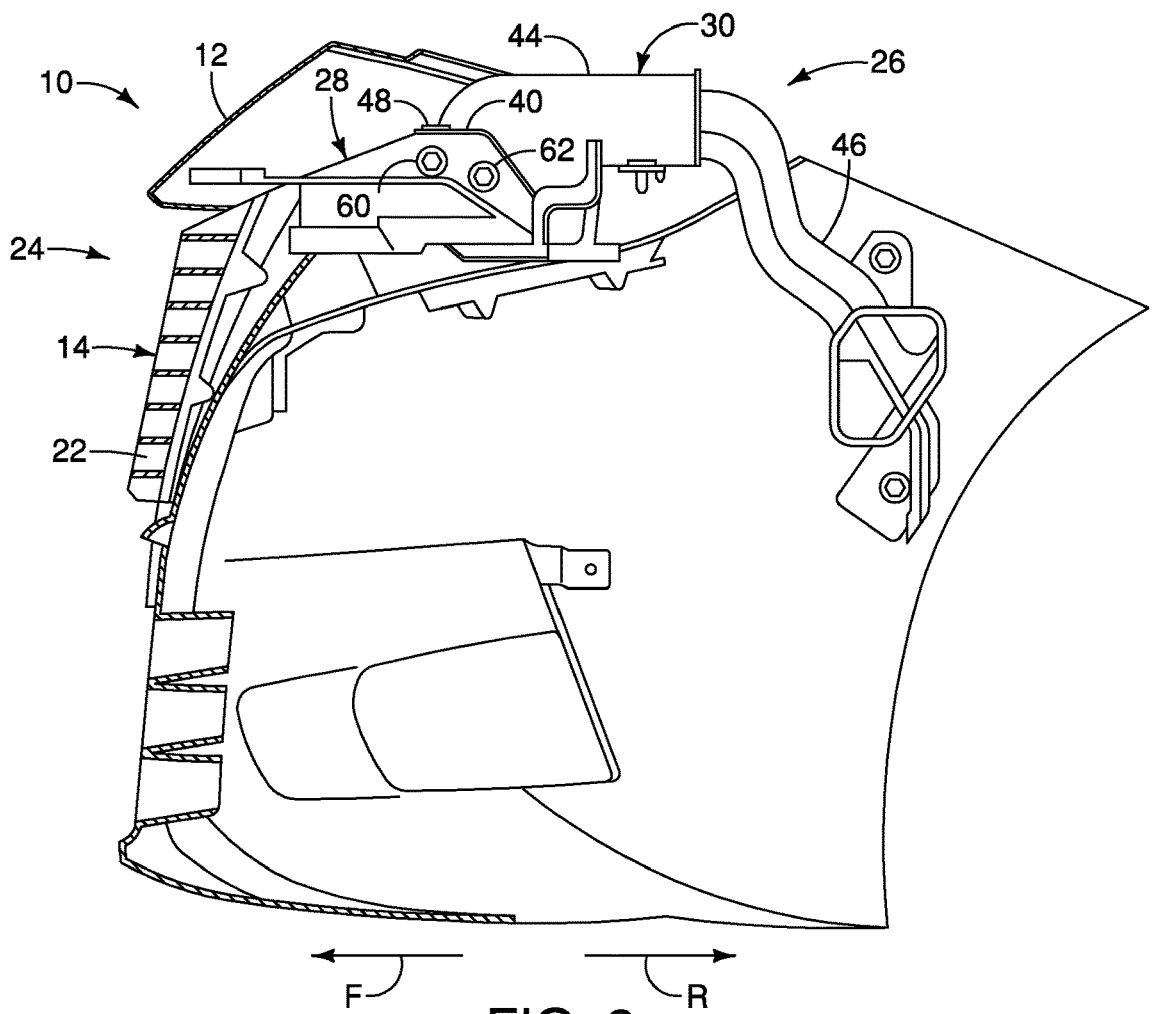
FIG. 3 is a side elevational view in partial cross section of the vehicle air induction assembly connected to the vehicle of FIG. 2.

Referring initially to FIGS. 1-3, a vehicle 10 includes a front vehicle fascia 12 and a grille member 14 connected thereto. The grille member 14 covers an opening 16 in the front fascia 12. A mesh portion 18 extends within an area defined by a frame member 20 of the grille member 14. A plurality of openings 22 are disposed in the mesh portion 18 and allow air to flow therethrough and into an engine compartment of the vehicle 10. The front fascia 12 is attached to a vehicle body structure of the vehicle 10 in a conventional manner. The grille member 14 is connected to the front fascia 12 in a conventional manner.

A vehicle air intake assembly 24 includes the vehicle fascia 12 and a vehicle air induction assembly 26 connected thereto. The vehicle air induction assembly 26 includes an air guide 28, an air duct 30 and a bracket member 32.

In FIGS. 1, 2, 3 and 8-11, several directions relative to the vehicle 10 are shown in order to define orientations of the various features of the vehicle 10 and the vehicle air induction assembly 26. Specifically, the vehicle 10 defines a longitudinal center line CL that extends in a lengthwise direction of the vehicle 10 along a central portion of the vehicle 10, as shown in FIG. 1. A forward direction F and a rearward direction R relative to the vehicle 10 are indicated by the depicted arrows in FIGS. 3 and 8-11. A lateral direction L relative to the vehicle 10 is indicated by the depicted arrows in FIG. 1. An inboard direction LI and an outboard direction LO relative to the longitudinal center line CL are also shown in FIG. 1.

Figure 9:
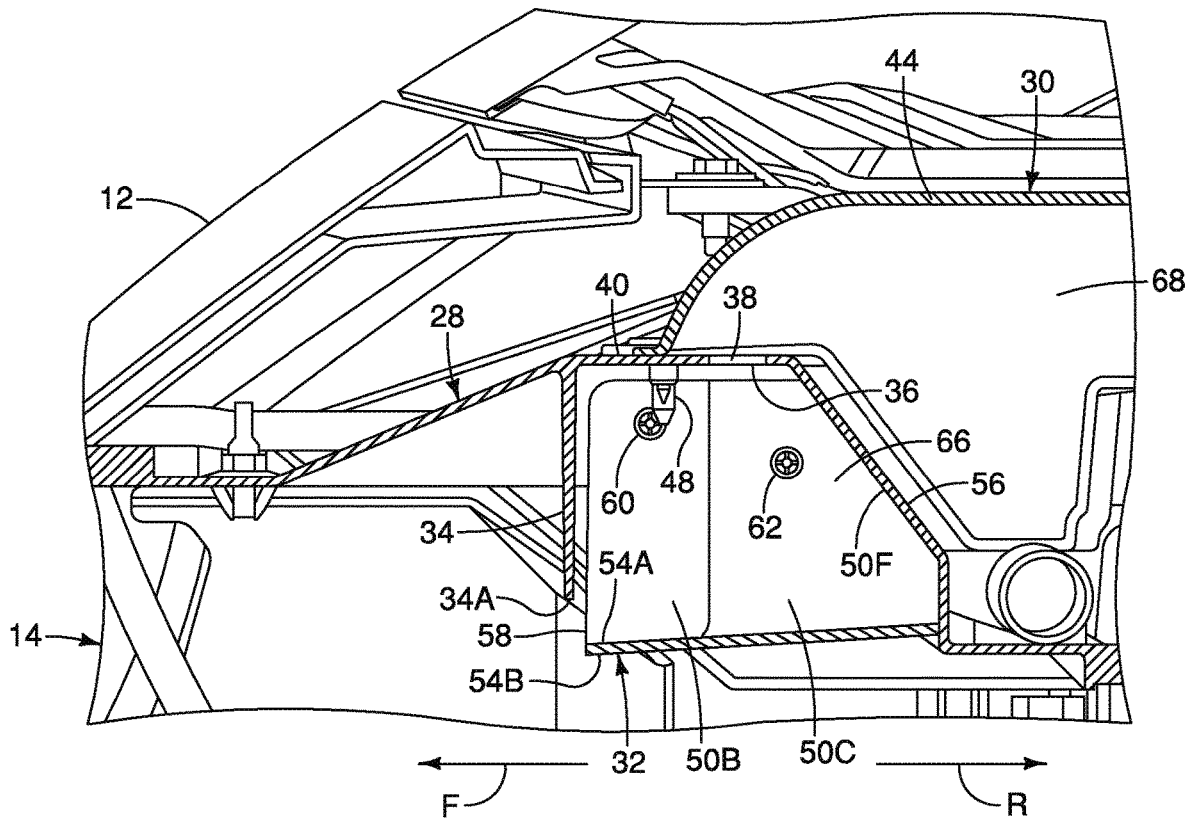
FIG. 9 is a side elevational view in partial cross section of the vehicle air induction assembly of FIG. 2 illustrating an air inlet.
Figure 11:
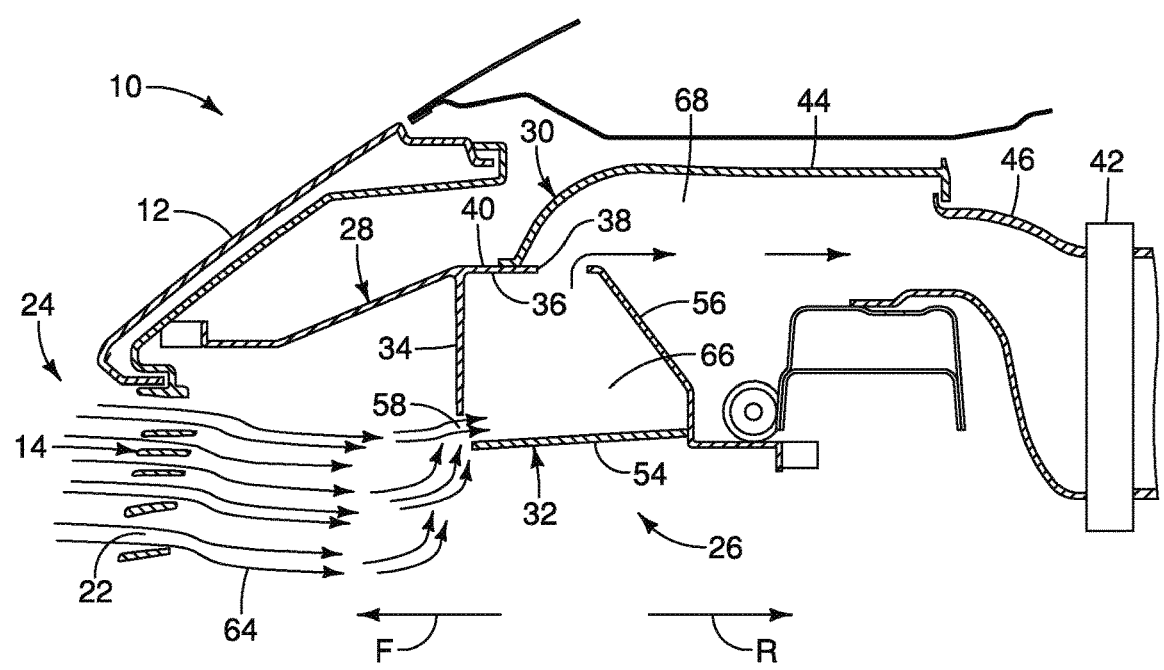
FIG. 11 is side elevational view of the air induction assembly of FIG. 2 illustrating an air flow path therethrough with a side wall of the bracket member removed for clarity.

The air guide 28 is configured to be connected to the vehicle fascia 12, as shown in FIGS. 2, 3, 9 and 11. The air guide 28 is connected to the vehicle fascia 12 in any suitable manner, such as with fasteners. A tab 34 extends outwardly from a lower surface 36 of the air guide 28. The tab 34 extends in the vehicle lateral direction L, and preferably extends substantially perpendicularly to the lower surface 36, as shown in FIGS. 9 and 11.

An opening 38 is disposed in air guide 28 rearwardly of the tab 34, as shown in FIGS. 9 and 11. The air guide opening 38 extends from an upper surface 40 of the air guide 28 to the lower surface 36. Preferably, the tab 34 has a width greater than a width of the air guide opening 38, although the tab 34 can have a width equal to or less than the width of the opening 38. Fastener openings 40A are disposed in the upper surface 40 of the air guide 28 on opposite sides of the opening 38. The fastener openings 40A are disposed in the rearward direction R relative to the tab 34.

The air duct 30 is configured to be connected to the air guide 28, as shown in FIGS. 2, 3, 9 and 11. The air duct 30 is configured to supply air through an engine air filter 42, as shown in FIG. 11, to the engine. The air duct 30 includes a cover member 44 configured to be connected to the air guide 28 and an air duct member 46 connected to the cover member 44. The cover member 44 of the air duct 30 has fastener openings 44A aligned with the fastener openings 40A in the upper surface 40 of the air guide 28 such that a fastener 48 can secure the air duct 30 to the air guide 28, as shown in FIGS. 3 and 9. The cover member 44 of the air duct 30 is disposed above the opening 38 in the air guide 28 to define an air flow path therebetween, as shown in FIGS. 9 and 11. The air duct 30 is configured to be connected to the air guide 28 such that the air flowing through the air guide opening 38 flows into the air duct 30. The air flow path is in fluid communication with the air duct member 46 of the air duct 30 to supply air to the engine air filter 42.

Figure 7:
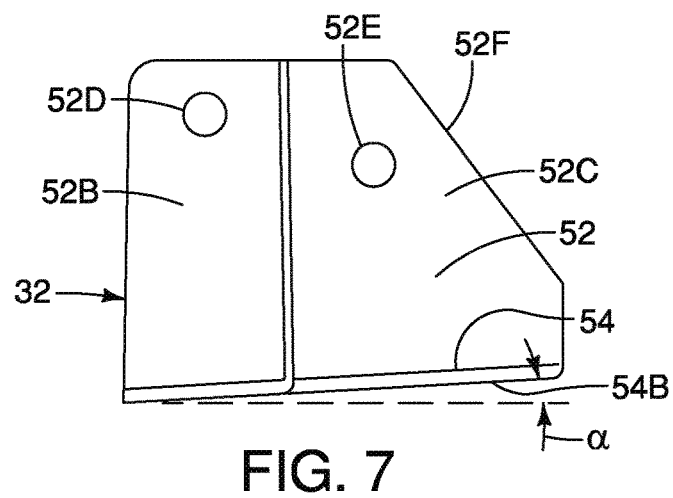
FIG. 7 is a side elevational view of the bracket member of FIG. 4.

The bracket member 32 is connected to the air guide 28, as shown in FIGS. 1-3 and 8-11. The bracket member 32 has a first side wall 50, a second side wall 52 and a lower wall 54 connecting the first side wall 50 and the second side wall 52, as shown in FIGS. 4-7. The lower wall 54 extends between a lower end 50A of the first side wall 50 and a lower end 52A of the second side wall 52. The lower wall 54 preferably extends substantially perpendicularly to the first and second side walls 50 and 52. The lower wall 54 has an upper surface 54A and an oppositely disposed lower surface 54B. The lower wall 54 preferably inclines upwardly at an angle α in the rearward direction, as shown in FIG. 7. The angle α is preferably approximately 3.4 degrees, although the angle α can be any suitable angle. The bracket member 32 is preferably made of a plastic material, such as polypropylene.

Figure 4:
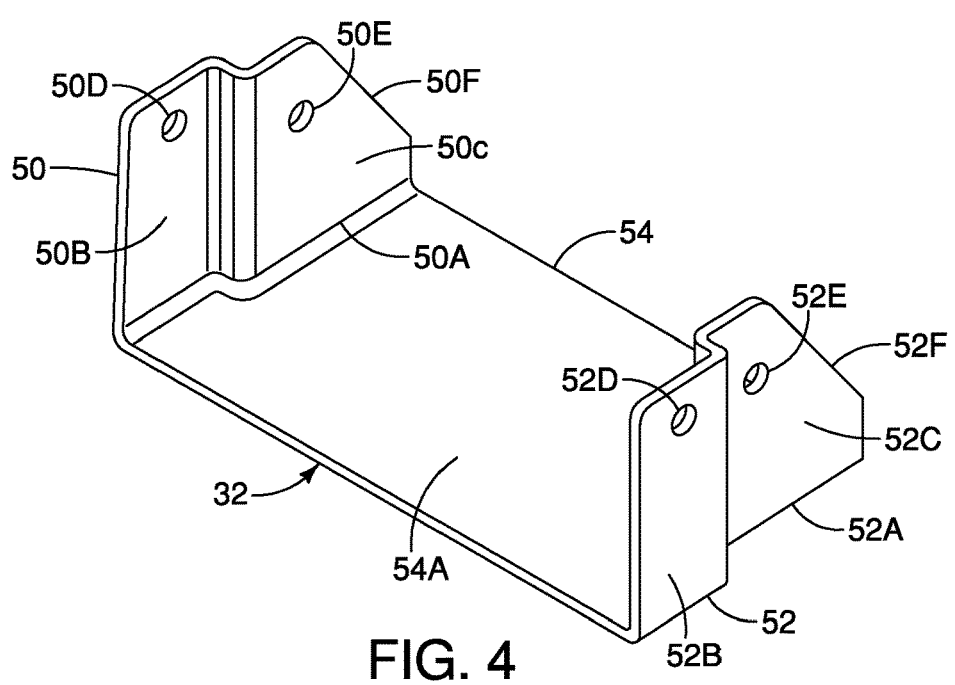
FIG. 4 is a perspective view of a bracket member of the vehicle air induction assembly of FIG. 1.
Figure 5:
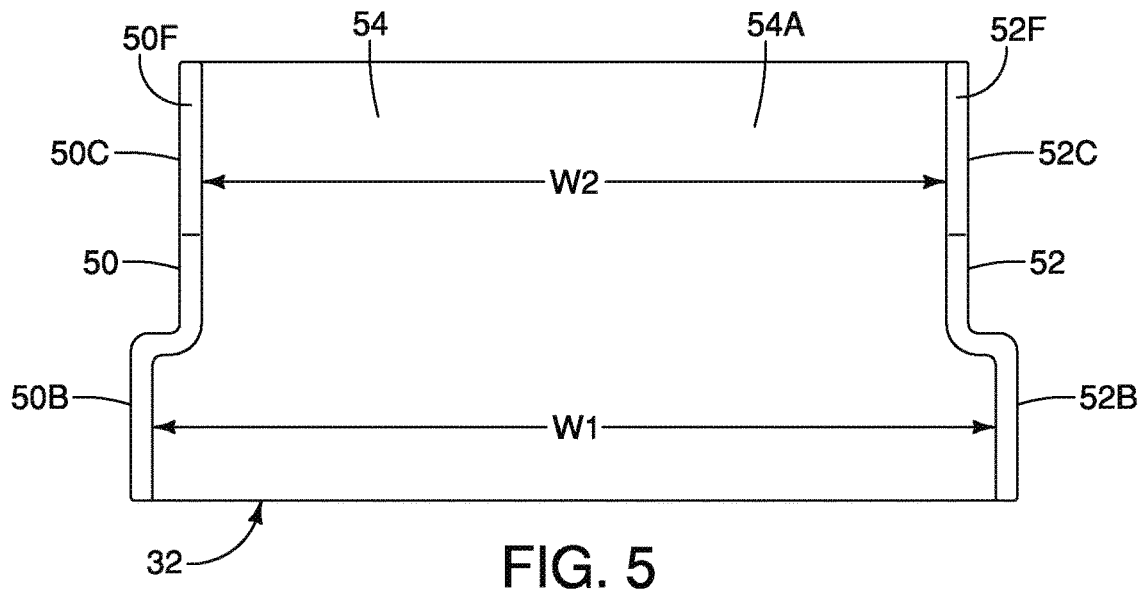
FIG. 5 is a top plan view of the bracket member of FIG. 4.
Figure 6:
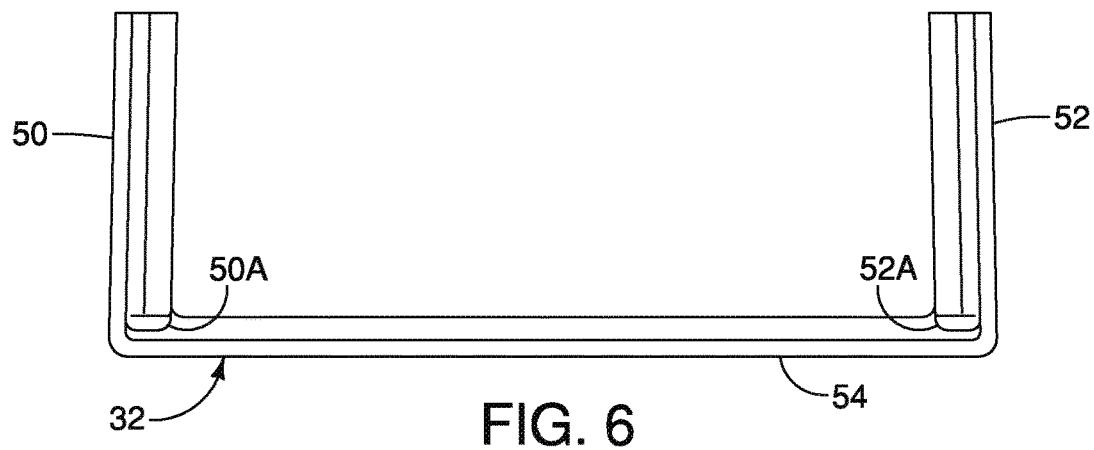
FIG. 6 is a rear elevational view of the bracket member of FIG. 4.
Figure 10:
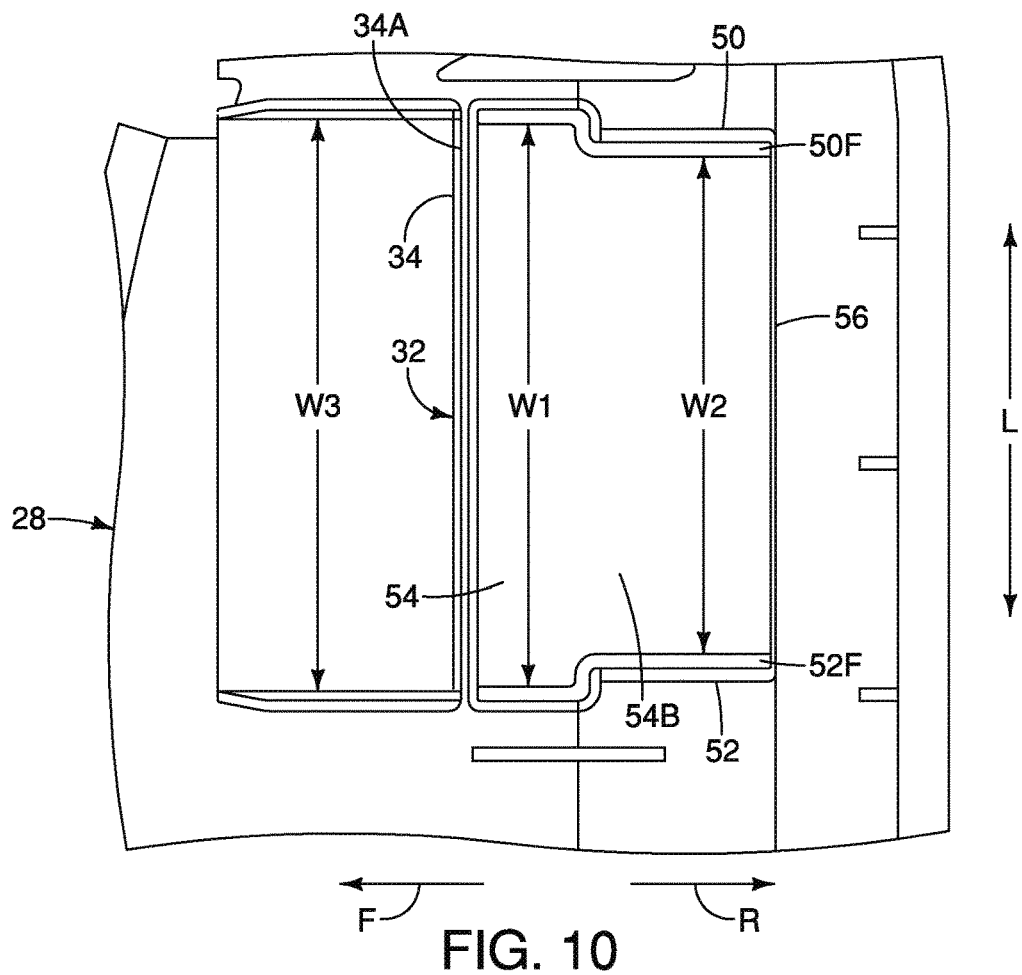
FIG. 10 is a bottom plan view of the bracket member connected to the air guide of FIG. 8.

The first and second side walls 50 and 52 have oppositely disposed first portions 50B and 52B and oppositely disposed second portions 50C and 52C, as shown in FIGS. 4 and 5. A first width W1 between the first portions 50B and 52B of the first and second side walls 50 and 52 is larger than a second width W2 between the second portions 50C and 52C of the first and second side walls 50 and 52, as shown in FIGS. 5 and 10. First fastener openings 50D and 52D are formed in the first portions 50B and 52B of the first and second side walls 50 and 52, as shown in FIG. 4. The first fastener openings 50D and 52D are oppositely disposed. Second fastener openings 50E and 52E are formed in the second portions 50B and 52B of the first and second side walls 50 and 52. The second fastener openings 50E and 52E are oppositely disposed. Tapered portions 50F and 52F of the first and second side walls 50 and 52 taper toward the lower wall 54 of the bracket member 32 in a rearward direction R, as shown in FIGS. 4, 5, 7, 9 and 10.

As shown in FIGS. 1-4 and 9-11, the air guide 28 is connected to the vehicle fascia 12 in any suitable manner. The bracket member 32 is connected to the air guide 28. Each of the first fastener openings 50D and 52D in the first portions 50B and 52B of the first and second side walls 50 and 52 is aligned with a corresponding fastener opening in the air guide 28 to properly position the bracket member 32 relative to the air guide 28. Each of the second fastener openings 50E and 52E in the second portions 50C and 52C of the first and second side walls 50 and 52 is aligned with a corresponding fastener opening in the air guide 28 to properly position the bracket member 32 relative to the air guide 28. Fasteners 60 are received by the aligned fastener openings 50D and 52D in the bracket member 32 and the corresponding fastener openings in the air guide 28 to secure the bracket member 32 to the air guide 28. Fasteners 62 are received by the aligned fastener openings 50E and 52E in the bracket member 32 and the corresponding fastener openings in the air guide 28 to secure the bracket member 32 to the air guide 28. An outer surface of the first side wall 50 of the bracket member 32 faces in the vehicle inboard direction LI and an outer surface of the second side wall 52 of the bracket member 32 faces in the vehicle outboard direction LO.

The air duct 30 is connected to the air guide 28, as shown in FIGS. 1-3, 9 and 11. Each of the plurality of fastener openings 44A in the cover member 44 of the air duct 30 is aligned with a corresponding fastener opening 40A in the upper surface 40 of the air guide 28 to properly position the air duct 30 relative to the air guide 28. Fasteners 48 are received by the aligned fastener openings 44A in the air duct 30 and the fastener openings 40A in the air guide 28 to properly position and secure the air duct 30 to the air guide 28. As shown in FIGS. 9 and 11, the bracket member 32 and the air duct 30 are disposed on opposite sides of the air guide opening 38. The bracket member 32 contacts the lower surface 36 of the air guide 28. The air duct 30 contacts the upper surface 40 of the air guide 28. As shown in FIGS. 9 and 11, the air guide 28 is disposed between the air duct 30 and the bracket member 32. The fasteners 60 and 62 are removable such that the bracket member 32 can be removed and/or replaced as necessary.

Figure 8:
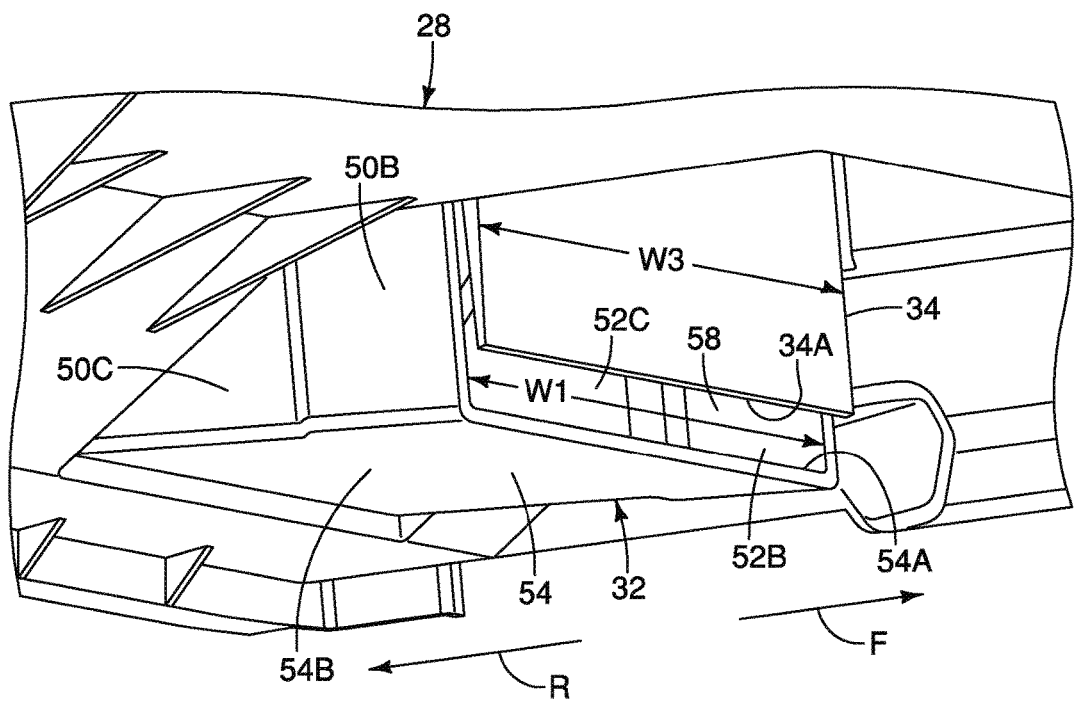
FIG. 8 is a perspective view of the bracket member connected to an air guide of the vehicle air induction assembly of FIG. 2.

An air inlet 58 is defined by the air guide 28 and the bracket member 32, as shown in FIGS. 8, 9 and 11. The air inlet 58 is defined by the tab 34 of the air guide 28 and the first and second side walls 50 and 52 and the lower wall 54 of the bracket member 32. As shown in FIG. 9, an upper portion of the air inlet 58 is formed by a lower edge 34A of the tab 34. A lower portion of the air inlet 58 is formed by a forward end of the upper surface 54A of the lower wall 54 of the bracket member 32. Sides of the air inlet 58 are formed by forward ends of the first portions 50B and 52B of the first and second side walls 50 and 52.

The tab 34 extends downwardly from the lower surface 36 of the air guide 28, as shown in FIGS. 8, 9 and 11. The tab 34 is disposed forward of the bracket member 32 in a longitudinal direction of the vehicle indicated by the arrow F. The tab 34 is preferably spaced from the bracket member 32 in the longitudinal direction of the vehicle. As shown in FIG. 10, a width W3 of the tab 34 is substantially equal to the width W1 of the bracket member 32 defining the air inlet 58. In other words, the width W3 of the tab 34 is substantially equal to the width W1 of the lower wall 54 between the first portions 50B and 52B of the first and second side wall 50 and 52. As shown in FIGS. 8, 9 and 11, a height of the tab 34 is less than a height of the bracket member 32, thereby forming the air inlet 58.

Air 64 flows into the engine compartment of the vehicle 10 through the grille member 14, as shown in FIG. 11. The air 64 flows into the air induction assembly 26 through the air inlet 58 defined by the air guide 28 and the bracket member 32. The air 64 flows through an air flow passage 66 defined by the first and second side walls 50 and 52 and the lower wall 54 of the bracket member 32. The first and second side walls 50 and 52 and the lower wall 54 of the bracket member 32 contact a wall 56 of the air guide, thereby directing the air flow in the air flow passage 66 to the air guide opening 38. The air guide opening 38 is disposed rearward of the air inlet 58. In other words, the air inlet 58 is disposed forward of the air guide opening 38 in the longitudinal direction of the vehicle 10.

The air inlet 58 is disposed substantially perpendicularly relative to the air guide opening 38, as shown in FIGS. 9 and 11. The air inlet 58 faces in the forward direction F of the vehicle. The air guide opening 38 faces upwardly. In other words, the air inlet 58 faces in a horizontal direction, and the air guide opening 38 faces in a vertical direction.

Air flows through the air guide opening 38 into a passage 68 defined by the cover member 44 of the air duct 30 and the air guide 28, as shown in FIGS. 9 and 11. The air flowing through the passage 68 is supplied to the air duct member 46 of the air duct 30. The air duct member 46 of the air duct 30 supplies the air through the air filter 42 to the engine. The vehicle air induction assembly 26 facilitates preventing foreign materials, such as snow, from being supplied to the engine air filter 42.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion." "member" or "element" when used in the singular can have the dual meaning of a single part or a plurality of parts. Also as used herein to describe the above embodiment(s), the following directional terms "forward", "rearward", "above" "downward", "vertical", "horizontal", "below" and "transverse" as well as any other similar directional terms refer to those directions of a vehicle frame equipped with the vehicle air induction assembly. Accordingly, these terms, as utilized to describe the present invention should be interpreted relative to a vehicle frame equipped with the vehicle air induction assembly.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air induction assembly comprising:
   an air duct configured to supply air to an engine air filter;
   an air guide having an opening therein and configured to be connected to a vehicle fascia, the air duct configured to be connected to the air guide such that air flowing through the opening flows into the air duct; and
   a bracket member connected to the air guide, the bracket member having a first side wall, a second side wall and a lower wall connecting the first and second side walls, the bracket member and the air duct being disposed on opposite sides of the air guide opening, the lower wall of the bracket member being substantially planar,
   an air inlet being defined by the air guide and the bracket member,
   the first and second side walls and the lower wall of the bracket member guiding air flow from the air inlet to the air guide opening.

2. The vehicle air induction assembly accordingly to claim 1, wherein
   the air guide opening extends from an upper surface to a lower surface of the air guide, the air duct being connected to the upper surface of the air guide.

3. The vehicle air induction assembly accordingly to claim 1, wherein
   a tab extends downwardly from the lower surface of the air guide, the tab being disposed forward of the bracket member in a longitudinal direction of the vehicle.

4. The vehicle air induction assembly accordingly to claim 3, wherein
   the tab is spaced from the bracket member.

5. The vehicle air induction assembly accordingly to claim 3, wherein
   a width of the tab is substantially equal to a width of the bracket member.

6. The vehicle air induction assembly accordingly to claim 3, wherein
   a height of the tab is less than a height of the bracket member.

7. The vehicle air induction assembly accordingly to claim 1, wherein
   a plurality of fastener openings are disposed in each of the first and second side walls of the bracket member, each of the plurality of fastener openings being configured to receive a fastener to secure the bracket member to the air guide.

8. The vehicle air induction assembly accordingly to claim 3, wherein
   an upper portion of the air inlet is formed by a lower edge of the tab, and a lower portion of the air inlet is formed by an upper surface of the lower wall of the bracket member.

9. A vehicle air intake assembly comprising:
a vehicle fascia; and
a vehicle air induction assembly connected to the vehicle fascia, the vehicle air induction assembly including
an air guide having an opening therein and connected to a vehicle fascia;
an air duct connected to the air guide such that air flowing through the air guide opening flows into the air duct, the air duct being configured to supply air to an engine air filter; and
a bracket member connected to the air guide, the bracket member and the air duct being disposed on opposite sides of the air guide opening,
an air inlet being defined by the air guide and the bracket member,
the bracket member including a first side wall, a second side wall and a lower wall connecting the first and second side walls, the lower wall of the bracket member being substantially planar, the first and second side walls and the lower wall of the bracket member guiding air flow from the air inlet to the air guide opening.

10. The vehicle air intake assembly accordingly to claim 9, wherein
the first and second side walls are connected to the air guide.

11. The vehicle air intake assembly accordingly to claim 9, wherein
the air guide opening extends from an upper surface to the lower surface of the air guide, the air duct being connected to the upper surface of the air guide.

12. The vehicle air intake assembly accordingly to claim 11, wherein
a tab extends downwardly from the lower surface of the air guide, the tab being disposed forward of the bracket member in a longitudinal direction of the vehicle.

13. The vehicle air intake assembly accordingly to claim 12, wherein
the tab is spaced from the bracket member.

14. The vehicle air intake assembly accordingly to claim 13, wherein
the air inlet is defined by a lower edge of the tab, a forward end of the lower wall of the bracket member, and forward ends of the first and second side walls of the bracket member.

15. The vehicle air intake assembly accordingly to claim 14, wherein
a grille member is connected to the vehicle fascia, air being supplied to the air flow passage through the grille member.

16. The vehicle air intake assembly accordingly to claim 12, wherein
a height of the tab is less than a height of the bracket member.

17. The vehicle air intake assembly accordingly to claim 14, wherein
the air inlet is disposed forward of the air guide opening in a vehicle longitudinal direction.

18. The vehicle air induction assembly accordingly to claim 1, wherein
a rearmost end of the lower wall of the bracket member is disposed rearward of the opening in the air guide in a flow direction of the air.

19. The vehicle air induction assembly accordingly to claim 9, wherein
a rearmost end of the lower wall of the bracket member is disposed rearward of the opening in the air guide in a flow direction of the air.

* * * * *